(12) United States Patent
Taillie

(10) Patent No.: US 7,605,958 B2
(45) Date of Patent: Oct. 20, 2009

(54) DESIGN PARAMETERS FOR A MULTI-ROW LINEAR PHOTOSENSOR ARRAY

(75) Inventor: Joseph P. Taillie, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 934 days.

(21) Appl. No.: 10/858,697

(22) Filed: Jun. 2, 2004

(65) Prior Publication Data

US 2005/0270596 A1  Dec. 8, 2005

(51) Int. Cl.
  H04N 1/46 (2006.01)
  H04N 1/04 (2006.01)

(52) U.S. Cl. .................. 358/514; 358/513; 358/482; 358/483

(58) Field of Classification Search .......... 358/514, 358/513, 482, 483, 505, 498, 463, 3.21, 504, 358/512, 474; 382/275, 274, 312, 317, 318; 250/208.1, 234, 559.4, 208.3; 355/84, 81
See application file for complete search history.

(56) References Cited

U.S. PATENT DOCUMENTS

| | | | |
|---|---|---|---|
| 5,373,372 A * | 12/1994 | Loewen | 358/474 |
| 5,543,838 A | 8/1996 | Hosier et al. | 348/311 |
| 5,956,087 A | 9/1999 | Takayama et al. | 348/275 |
| 6,115,139 A | 9/2000 | Hosier et al. | 358/1.9 |
| 6,465,801 B1 * | 10/2002 | Gann et al. | 250/559.4 |
| 6,486,974 B1 * | 11/2002 | Nakai et al. | 358/514 |
| 6,839,153 B1 * | 1/2005 | Shimizu | 358/3.21 |
| 6,937,361 B1 * | 8/2005 | Kondo et al. | 358/498 |
| 7,072,075 B2 * | 7/2006 | Kondo et al. | 358/463 |
| 7,158,271 B2 * | 1/2007 | Sawada | 358/505 |
| 7,183,532 B2 * | 2/2007 | Gann | 382/274 |
| 7,477,432 B2 * | 1/2009 | Hiromatsu | 358/514 |
| 2002/0158192 A1 * | 10/2002 | Gann | 250/234 |
| 2004/0057616 A1 * | 3/2004 | Kondo et al. | 382/275 |
| 2007/0109605 A1 * | 5/2007 | Shimizu | 358/463 |

* cited by examiner

Primary Examiner—Houshang Safaipour
(74) Attorney, Agent, or Firm—Edward A. Brown; Prass LLP

(57) ABSTRACT

In an imaging apparatus, such as used for recording full-color images from a moving sheet, different rows of photosensors are each filtered to record one primary color. Certain specific spacings of adjacent rows of photosensors are particularly useful in operating the apparatus at different commonly-used output speeds.

20 Claims, 1 Drawing Sheet

DESIGN PARAMETERS FOR A MULTI-ROW LINEAR PHOTOSENSOR ARRAY

INCORPORATION BY REFERENCE

The following U.S. Patents are incorporated by reference for the teachings therein: U.S. Pat. Nos. 5,543,838 and 6,115, 139.

TECHNICAL FIELD

The present disclosure relates to image sensor arrays having multiple rows of photosensors, each row of photosensors being sensitive to a particular primary color. Such image sensor arrays are used, for example, for full-color scanning of hard-copy original images.

BACKGROUND

Image sensor arrays typically comprise a linear array of photodiodes which raster scan an image-bearing document and convert the microscopic image areas viewed by each photodiode to image signal charges. Following an integration period, the image signals are amplified and transferred to a common output line or bus through successively actuating multiplexing transistors.

In one practical application, separate linear arrays of photosensors are arranged in parallel on a single bar formed from a set of silicon chips, the photosensors in each linear array being provided with a filter thereon of one primary color. The bar is caused to move relative to an original image in a scan direction which is generally perpendicular to the direction of the arrays. As the sensor bar moves along the original image, each portion of the area of the original image is exposed to each of the linear arrays of photosensors in sequence. As each array of photosensors moves past a particular small area in the original image, signals according to the different primary colors of that area are output by one of the photosensors in each array. In this way three separate sets of signals, each relating to one primary color, are produced by the linear arrays of photosensors.

An important parameter in the design of an image sensor array is the resolution of the array, which will of course affect the quality of image signal based on an original image. One type of resolution is dictated by the physical configuration of the individual photosensors along the array: the higher the number of individual photosensors within a given unit of length along the array, the higher the possible resolution of data that may be output by the array. This "fast scan" or x-direction resolution is of course fixed by the size and spacing of the photosensors in the array.

Another type of resolution associated with an array is the "slow-scan," or y-direction, resolution, which is the resolution of the image along the direction perpendicular to the direction of the array, which would be the direction of an original image moving relative to the array. In contrast to the x-dimension resolution, which is fixed by the physical characteristics of the array, the y-direction resolution is determined by the speed of an original image relative to the array, coupled with the integration times of individual photosensors. In a practical application, of course, the y-direction resolution is the result of a motor speed causing the sheet to move past the photosensors at a predetermined velocity, coupled with operation of the array circuitry in a manner consistent with the motor speed. If the original image is moving relative to the array at a constant velocity, and the photosensor is operating at a high speed, each integration time of the photosensor will cause exposure to a relatively small area on the original image; if the integration time is longer, with each integration time an individual photosensor will be "looking at" a relatively larger area of the original image. In brief, the shorter the integration time of an individual photosensor in the array, the higher the y-direction resolution of the array.

A technical complication may result where the desired y-direction resolution, which is related to the integration times in an array, is different from the inherent y-direction resolution for which the array was designed. For example, one possible design for a full-page-width full-color array provides, by virtue of its photosensor size, a fixed 400 SPI resolution in the x-dimension, but can provide, by virtue of the operational speed of the photosensors, a 600 SPI resolution in the y-direction. Such an array could, under certain circumstances, be used to provide additional y-direction resolutions, for example 300 SPI. The present disclosure is directed to physical and operating parameters of a full-color scanning array which addresses certain design requirements.

PRIOR ART

U.S. Pat. No. 5,543,838 discloses multiplexing systems for reading out signals from a full-color image sensor bar having three linear arrays of photosensors, each linear array having a filter thereon for one primary color.

U.S. Pat. No. 5,956,087 teaches a type of analysis for the placement and spacing of photosensors in a linear image sensor.

U.S. Pat. No. 6,115,139 teaches certain relative pitch lengths between rows of photosensors in a color array.

SUMMARY

There is provided an imaging apparatus for recording an image borne on a sheet moving relative to the apparatus in a process direction. There is provided a first row of photosensors and a second row of photosensors, the rows of photosensors extending in a direction perpendicular to the process direction, the first row of photosensors and second row of photosensors being spaced by a line spacing. The line spacing is one of 0.0578+/−0.010 mm, 0.0694+/−0.010 mm, 0.0847+/−0.010 mm, 0.0924+/−0.010 mm, 0.1113+/−0.010 mm, 0.0381+/−0.010 mm, 0.0508+/−0.010 mm, 0.0762+/−0.010 mm, 0.0889+/−0.010 mm, and 0.1016+/−0.010 mm.

DETAILED DESCRIPTION

Figure 1:
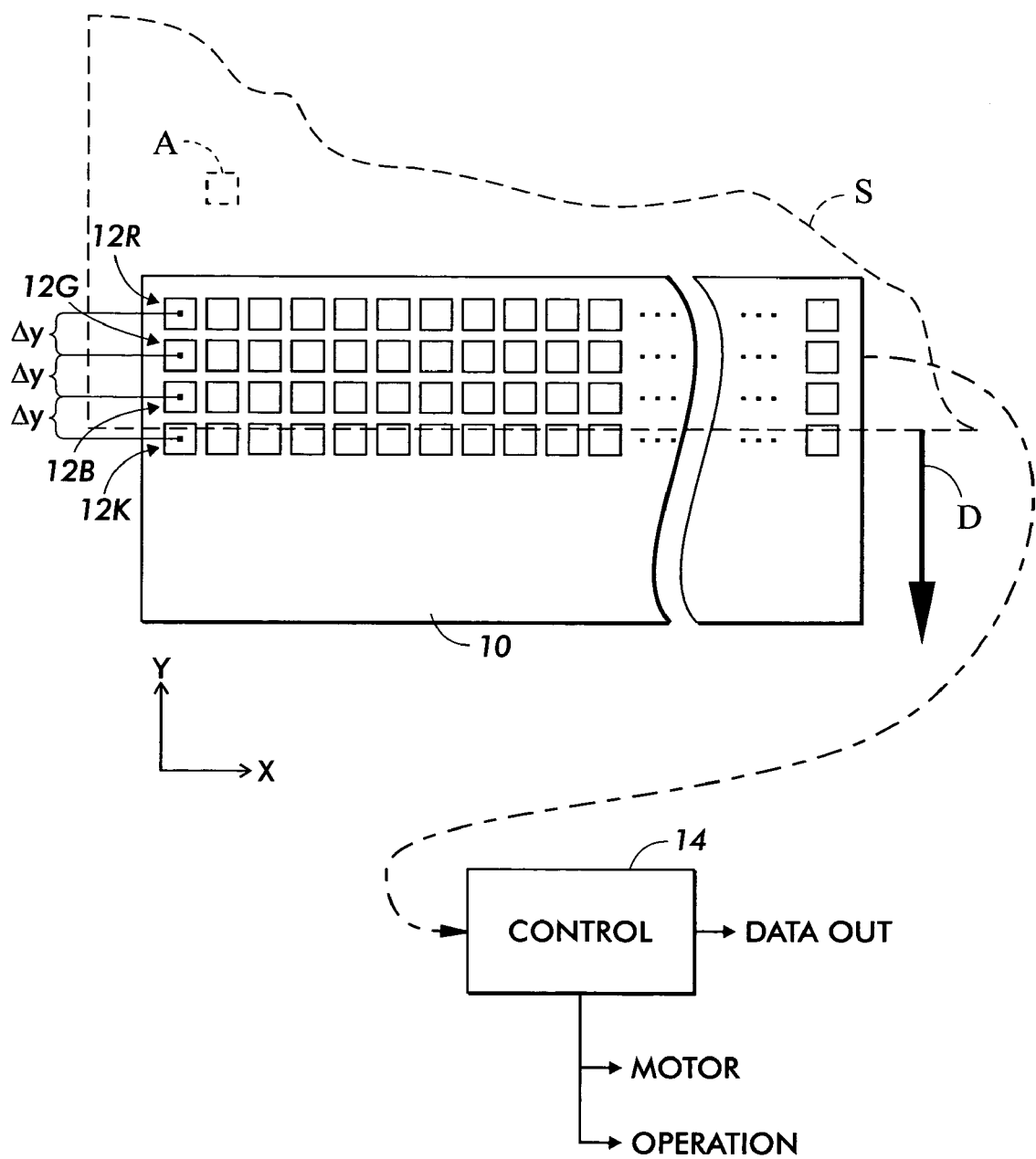
FIG. 1 is a diagram showing the relationship of an example portion of a full-color photosensor array recording digital data based on an original hard copy image on a sheet.

FIG. 1 is a diagram showing the relationship of an example portion of a full-color photosensor array recording digital data based on an original hard copy image on a sheet. A chip indicated as 10 represents all or part of a full-color sensor bar; as is known in the art, such a sensor bar may include a single chip, which is exposable to a page-width image through reduction optics, or could be one chip in a butted array of similar chips in a full-page-width array. The chip 10, in this embodiment, includes thereon three rows of photosensors, here indicated as 12R (Red), 12G (Green), and 12B (Blue). As is familiar in the art, each row of photosensors is made sensitive to one primary color, such as by including a translucent filter thereon (not shown). Although the illustrated embodiment shows a full-color array, it is not required for present purposes that each row be specifically color-sensitive.

An original image which is desired to be converted into digital data is borne on a sheet, an outline of a portion of which is shown in phantom in FIG. 1 as S. As is familiar in the art of hard-copy scanning, sheet S is moved at a predetermined constant velocity in a process direction, here indicated as D, which is perpendicular to the direction of extension of each row of photosensors 12R, 12G, and 12B. In this way, a particular small area on sheet S, such as the example small area indicated as A in FIG. 1, is sequentially exposed to one photosensor for each primary color in the array. As the small area A of the original image moves past each primary-color-sensitive photosensor, its color properties are recorded for each primary color in sequence. A row of small areas A must pass over each of the three linear arrays of photosensors 12R, 12G, and 12B, for the color properties of the row of small areas to be recorded by the photosensors.

Also shown in the Figure is a fourth row of photosensors, indicated as 12K. Some possible architectures may provide for a fourth row of photosensors, such as to include a "clear" (substantially unfiltered along the visible spectrum) row, or a high-pass, low-pass, infra-red or other color filtered (such as orange) row, depending on a specific need.

In a practical embodiment of a full-color array, there is typically a single output line or equivalent thereof for all rows, 12R, 12G, 12B, of photosensors, and at a particular time, there will be output from chip 10 relatively long series of video signals, corresponding to, for example, all of the red signals in a scan line, then all the green signals in the scan line, and then all the blue signals.

A control system for operating the chip 10 and other necessary software and hardware is shown as 14: in a practical application, such as in a digital copier, the functions of a control system 14 may be embodied, in whole or in part, on chip 10, or in one or more external processors. The control system 14 operates the chip 10, by sending signals to the chip 10 consistent with a predetermined integration time for the photosensors. Simultaneously, control system 14 operates a motor (not shown) for moving the sheet S past chip 10 at a predetermined constant velocity, this velocity being consistent with the integration time. As mentioned above, the combination of sheet velocity and integration time gives each photosensor in a row 12R, 12G, 12B an opportunity to "look at" a particular small area A in the sheet, and thus record image data related to the small area. A set of small areas A across direction X on a sheet S is referred to as a "scanline," and represents the area that is recorded by a row of photosensors at a given time as the sheet moves in direction D.

The digital data output by the chip may be organized by control system 14 in a predetermined manner, and thus made suitable for downstream processing and storage. In a standard readout architecture, for each scanline of small areas A, the image data from one row of photosensors such as 12R is read out of the chip 10, followed by image data from the next row of photosensors such as 12G and then image data from one row of photosensors such as 12B; according to variations of the architecture, the data corresponding to one or another row may be buffered for a predetermined time within each readout cycle and the order of which row reads out at what time may be varied.

In a line-scan system, the slow-scan sample spacing used to scan an original is determined by the desired sample density fy, usually expressed in lines per inch. So, for example, in a 600 lpi system, between successive samples the original must be made to advance by $\frac{1}{600}''=0.0017''$ or 0.042 mm. The line spacing $\Delta y$ (shown in FIG. 1) is given by $$\Delta y = 1/f_y \tag{1}$$

The line spacing is embodied on a chip 10 as the center-to-center distance between photosensors in adjacent rows of photosensors. The "center" of a photosensor may be determined taking into account the shapes (rectangular, triangle, parallelogram, etc.) and other configurations of the photosensors.

In the case of a multi-line sensor, there is an additional constraint that the original image on moving sheet S must advance by an amount sufficient to present the same view to the second sensor row as to the first. If each row acquires its sample at the same time as the others, the advance of the original must be an integer fraction of the row spacing. Taking the magnification of the imaging system to be unity, this implies the following relationship between the sample interval and the sensor row spacing, dy:

$$dy = N*\Delta y \tag{2}$$

where N is the number of line times between adjacent samples. Note that a buffer will be required to hold data between samples in order to provide the correct registration among the row images.

If, on the other hand, the rows of the sensor are timed independently, the second constraint above will not apply and the sample interval on the object need not be related to the sensor row spacing at all. Integration of the second row can begin whenever the document has advanced the appropriate amount.

An array having readout circuitry and control system such as in U.S. Pat. No. 5,543,838 uses a timing scheme in which integration does not begin simultaneously on all rows but, because the various rows share the same readout circuitry, the timing cannot be selected at will. Instead, all rows can be read out sequentially within one line time. Normally, each row readout occurs in $1/M^{th}$ of the sample time, where M is the number of sensor rows. This makes most efficient use of the available bandwidth since it maximizes the time available for readout. So, the start of integration is staggered by $1/M^{th}$ of the line time between rows.

Considering the case of a 3-row sensor, the original document image to be scanned passes by in such way that the image of a line, such as including one small area A, passes first over the red row, next over green, and finally over blue. After the red sensors acquire their signals, red readout takes place and the next red acquisition begins. The image will have moved the appropriate distance during the line interval. Similarly, the green signals and the blue signals are acquired, but the start of their integrations are delayed so that they can be read out separately from red and from each other. The delay between the start of the various integration times among the colors is referred to as the skew, which is expressed as a fraction of a line time. In the simplest case, the skews must be equal to maintain the row registration.

For the case of equal skews, the sensor spacing must now be related to the sum of an integer number of line times plus the skew. If the desired sample spacing is $\Delta y = \frac{1}{600}''=0.042$ mm for a three-row sensor, the optimum skew is $\frac{1}{3}$ of the line time since the full line time is used to read data out, minimizing the bandwidth. The row spacing on the sensor must then be given by $$dy = \Delta y * (N + 1/M) \quad (3)$$
$$= .042 \text{ mm} * (N + 1/3)$$

where N is now the number of whole line times between rows. Possible choices for dy are
$dy_0 = 0.014$ mm; N=0
$dy_1 = 0.056$ mm; N=1
$dy_2 = 0.099$ mm; N=2 etc.

Notice that it is possible to choose a skew of ⅔ as well since this also makes full use of a line time to shift data out. Now,
$dy = 0.042$ mm*(N+⅔) or
$dy_0 = 0.028$ mm; N=0
$dy_1 = 0.071$ mm; N=1
$dy_{2=0.113}$ mm; N=2 etc.

By satisfying the constraint equation (3) for two different sample spacings simultaneously, it is possible to design a sensor that is optimized for both. First, if a three-row 600 lpi sensor is used to sample at 300 lpi, if the skew is ⅓, the resulting row spacing is 0.042 mm*(1+⅓)=0.056 mm. Reducing the sample rate to 300 lpi gives a sample spacing of 0.084 mm and a line spacing of 0.084 mm (0+⅔)=0.056 mm. So, the same sample spacing is used and in each case, the line time is fully utilized for reading out the data from the three rows. This is a special case that results from the unique integer multiple relationship between 300 lpi and 600 lpi. There are cases, however, where this relationship need not exist.

It can be seen that there are cases of row spacings that are particularly effective for several sample frequencies. By careful selection of line spacings inherent to the chip 10, it is possible to read out the sensor at multiple time resolutions (speeds) with relatively small inefficiencies in readout. The selection criterion is that the line spacing must simultaneously satisfy the condition that the skew be a multiple of the reciprocal of the number of sensor rows for each of the sampling rates.

Below are favorable lengths for the line spacing $\Delta y$ for any two adjacent photosensors or rows of photosensors. In view of the above considerations, these line spacings provide favorable results in terms of data output speed for each of a plurality of output rates, which is expressed in terms of scanlines per inch or lpi. In other words, these line spacings, which are inherent to the structure of a chip 10, are useful because they enable the circuitry within the chip 10 to be operated at any of a number of "round-numbered" speeds with favorable results.

For a 3-row chip:
0.0578+/−0.010 mm (100, 200, 300, 600, 800, 1000, 1200, 2400 lpi)
0.0694+/−0.010 mm (100, 200, 300, 600, 800, 1000, 1200, 2400 lpi)
0.0847+/−0.010 mm (100, 200, 400, 800, 1000 lpi)
0.0924+/−0.010 mm (100, 200, 400, 600, 1000, 1200, 2400 lpi)
0.1113+/−0.010 mm (100, 300, 400, 600, 1000, 1200 lpi)

For a 4-row chip:
0.0381+/−0.010 mm (100, 200, 300, 400, 600, 800, 1000, 1200, 2400 lpi)
0.0508+/−0.010 mm (100, 200, 300, 400, 600, 800, 1200, 2400 lpi)
0.0762+/−0.010 mm (100, 200, 300, 400, 600, 800, 1200, 2400 lpi)
0.0889+/−0.010 mm (100, 200, 400, 800, 1000, 1200, 2400 lpi)
0.1016+/−0.010 mm (100, 200, 300, 400, 600, 800, 1200, 2400 lpi)

It should also be noted that the only parameter which contributes to a desirable line spacing is the selected operational speed of the chip; the spacing of photosensors along the x-axis is irrelevant.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. An imaging apparatus for recording an image borne on a sheet moving relative to the imaging apparatus in a process direction, comprising:
   a first row of photosensors and a second row of photosensors, the first row of photosensors and second row of photosensors extending in a direction perpendicular to the process direction, and the first row of photosensors and second row of photosensors being spaced by a line spacing;
   the line spacing being one of 0.0578+/−0.010 mm, 0.0694+/−0.010 mm, 0.0924+/−0.010 mm, and 0.1113+/−0.010 mm;
   when the line spacing is 0.0578+/−0.010 mm, signals are read out from the imaging apparatus at a speed consistent with a resolution of one of 100, 200, 300, 800, 1000 and 1200 lpi.

2. The apparatus of claim 1, further comprising
   a third row of photosensors extending in a direction perpendicular to the process direction, the third row of photosensors being spaced from the second row of photosensors by the line spacing.

3. The apparatus of claim 1, the first row of photosensors and second row of photosensors each being sensitive to a primary color.

4. The apparatus of claim 1, further comprising
   output means for reading out signals from the first row of photosensors and second row of photosensors.

5. The apparatus of claim 4, the output means reading out signals from each of a plurality of photosensors in the first row of photosensors and then signals from each of a plurality of photosensors in the second row of photosensors, for a scanline of small areas on the sheet.

6. The apparatus of claim 4, the line spacing being one of 0.0694+/−0.010 mm, 0.0924+/−0.010 mm, and 0.1113+/−0.010 mm, the output means reading out signals from the imaging apparatus at a speed consistent with a resolution of one of 100, 200, 300, 600, 800, 1000, and 1200, lpi.

7. The apparatus of claim 4, further comprising
   means for moving the sheet relative to the first row of photosensors and the second row of photosensors at a predetermined velocity consistent with operation of the output means.

8. The apparatus of claim 4, wherein:
   when the line spacing is 0.0694+/−0.010 mm, the output means reads out signals from the imaging apparatus at a speed consistent with a resolution of one of 100, 200, 300, 600, 800, 1000, and 1200 lpi;
   when the line spacing is 0.0924+/−0.010 mm, the output means reads out signals from the imaging apparatus at a speed consistent with a resolution of one of 100, 200, 400, 600, 1000, and 1200 lpi; and when the line spacing is 0.1113+/−0.010 mm, the output means reads out signals from the imaging apparatus at a speed consistent with a resolution of one of 100, 300, 400, 600, 1000, and 1200 lpi.

9. The apparatus of claim 8, wherein:
a third row of photosensors extends in the direction perpendicular to the process direction, the third row of photosensors being spaced from the second row of photosensors by the line spacing;
the first row of photosensors is sensitive to a first primary color;
the second row of photosensors is sensitive to a second primary color; and
the third row of photosensors is sensitive to a third primary color.

10. An imaging apparatus for recording an image borne on a sheet moving relative to the imaging apparatus in a process direction, comprising:
a first row of photosensors and a second row of photosensors, the first row of photosensors and second row of photosensors extending in a direction perpendicular to the process direction, and the first row of photosensors and second row of photosensors being spaced by a line spacing;
the line spacing being one of 0.0508+/−0.010 mm, and 0.1016+/−0.010 mm;
when the line spacing is 0.0508+/−0.010 mm, signals are read out from the imaging apparatus at a speed consistent with a resolution of one of 100, 200, 300, 800 and 1200 lpi.

11. The apparatus of claim 10, further comprising
a third row of photosensors and a fourth row of photosensors extending in a direction perpendicular to the process direction, the third row of photosensors being spaced from the second row of photosensors by the line spacing, and the fourth row of photosensors being spaced from the third row by the line spacing.

12. The apparatus of claim 10, the first row of photosensors and second row of photosensors each being sensitive to a primary color.

13. The apparatus of claim 10, further comprising
output means for reading out signals from the first row of photosensors and second row of photosensors.

14. The apparatus of claim 13, when the line spacing is 0.1016+/−0.010 mm, the output means reading out signals from the imaging apparatus at a speed consistent with a resolution of one of 100, 200, 300, 600, 800, 1200, and 2400 Ipi.

15. The apparatus of claim 13, the output means reading out signals from each of a plurality of photosensors in the first row of photosensors and then signals from each of a plurality of photosensors in the second row of photosensors, for a scanline of small areas on the sheet.

16. The apparatus of claim 13, further comprising
means for moving the sheet relative to the first row of photosensors and second row of photosensors at a predetermined velocity consistent with operation of the output means.

17. The apparatus of claim 13, wherein:
a third row of photosensors extends in the direction perpendicular to the process direction, the third row of photosensors being spaced from the second row of photosensors by the line spacing;
a fourth row of photosensors extends in the direction perpendicular to the process direction, the fourth row of photosensors being spaced from the third row of photosensors by the line spacing;
the first row of photosensors is sensitive to a first primary color;
the second row of photosensors is sensitive to a second primary color; and
the third row of photosensors is sensitive to a third primary color.

18. An imaging apparatus for recording an image borne on a sheet moving relative to the imaging apparatus in a process direction, comprising:
a first row of photosensors and a second row of photosensors, the first row of photosensors and second row of photosensors extending in a direction perpendicular to the process direction, and the first row of photosensors and second row of photosensors being spaced by a line spacing;
a third row of photosensors a fourth row of photosensors, the third row of photosensors and fourth row of photosensors extending in the direction perpendicular to the process direction, and the third row of photosensors and fourth row of photosensors being spaced by the line spacing; and
output means for reading out signals from the first row of photosensors and second row of photosensors;
wherein:
a) the line spacing is one of 0.0578+/−0.010 mm, 0.0694+/−0.010 mm, 0.0847+/−0.010 mm, 0.0924+/−0.010 mm, and 0.1113+/−0.010 mm, and when the line spacing is 0.0847+/−0.010 mm, the output means reads out signals from the imaging apparatus at a speed consistent with a resolution of one of 100, 200, 800, and 1000 lpi; or
b) the line spacing is one of 0.0694+/−0.010 mm, 0.0762+/−0.010 mm, 0.0889+/−0.010 mm, and 0.1016+/−0.010 mm, and when the line spacing is 0.0381+/−0.010 mm, the output means reads out signals from the imaging apparatus at a speed consistent with a resolution of one of 100, 200, 300, 400, 600, 800, 1000, and 1200 lpi.

19. The apparatus of claim 18, wherein:
the first row of photosensors is sensitive to a first primary color;
the second row of photosensors is sensitive to a second primary color;
the third row of photo sensors is sensitive to a third primary color; and
the line spacing is one of 0.0578+/−0.010 mm, 0.0694+/−0.010 mm, 0.0847+/−0.010 mm, 0.0924+/−0.010 mm, and 0.1113+/−0.010 mm.

20. The apparatus of claim 18, wherein:
the first row of photosensors is sensitive to a first primary color;
the second row of photosensors is sensitive to a second primary color;
the third row of photo sensors is sensitive to a third primary color; and
the line spacing is one of 0.0694+/−0.010 mm, 0.0762+/−0.010 mm, 0.0889+/−0.010 mm, and 0.1016+/−0.010 mm.

* * * * *